United States Patent
Eifert et al.

(10) Patent No.: US 9,744,857 B2
(45) Date of Patent: Aug. 29, 2017

(54) ELECTRIC CHARGING METHOD FOR A VEHICLE AND ELECTRIC VEHICLE CHARGING DEVICE

(71) Applicant: FORD GLOBAL TECHNOLOGIES, LLC, Dearborn, MI (US)

(72) Inventors: Mark Eifert, Hessen (DE); Peter Schmitz, Aachen NRW (DE)

(73) Assignee: Ford Global Technologies, LLC, Dearborn, MI (US)

(*) Notice: Subject to any disclaimer, the term of this patent is extended or adjusted under 35 U.S.C. 154(b) by 110 days.

(21) Appl. No.: 14/711,529

(22) Filed: May 13, 2015

(65) Prior Publication Data

US 2015/0329001 A1 Nov. 19, 2015

(30) Foreign Application Priority Data

May 15, 2014 (DE) ........................ 10 2014 209 249

(51) Int. Cl.
*H02J 7/00* (2006.01)
*B60L 1/00* (2006.01)
*B60L 3/00* (2006.01)
*B60L 11/18* (2006.01)
*H02J 7/14* (2006.01)
*H02J 7/34* (2006.01)

(52) U.S. Cl.
CPC ........ *B60L 1/00* (2013.01); *B60L 3/00* (2013.01); *B60L 11/18* (2013.01); *B60L 11/1809* (2013.01); *H02J 7/00* (2013.01); *H02J 7/1423* (2013.01); *H02J 7/34* (2013.01); *Y02T 10/7016* (2013.01)

(58) Field of Classification Search
CPC ... H02J 7/00; H02J 7/1423; H02J 7/34; B60L 1/00; B60L 3/00; B60L 11/18; B60L 11/1809; Y02T 10/7016
USPC ........ 320/104, 109, 112, 121, 134, 136, 164
See application file for complete search history.

(56) References Cited

U.S. PATENT DOCUMENTS

| | | | |
|---|---|---|---|
| 5,869,950 A * | 2/1999 | Hoffman, Jr. | B60K 6/28 320/103 |
| 8,186,466 B2 | 5/2012 | Verbrugge et al. | |
| 2003/0197484 A1* | 10/2003 | Kotlow | H02J 7/1461 320/104 |
| 2003/0207162 A1* | 11/2003 | Reiser | H01M 8/04223 429/429 |
| 2007/0184339 A1* | 8/2007 | Scheucher | H01M 2/1077 429/99 |
| 2007/0210743 A1 | 9/2007 | Tabei et al. | |

(Continued)

*Primary Examiner* — Phallaka Kik
(74) *Attorney, Agent, or Firm* — David B. Kelley; Brooks Kushman P.C.

(57) ABSTRACT

A system and method for charging a vehicle having a first battery, such as a high-voltage traction battery, and a second battery, such as a low-voltage battery, include controlling a DC converter or relay to effectively decouple the second battery from the converter when the vehicle is connected to an external power source to reduce or prevent damage to the second battery from extended or prolonged charging. The second battery may be effectively decoupled from the converter by controlling the relay or converter voltage based on state of charge of the second battery so that substantially zero current flows to and from the second battery relative to the converter and any vehicle low voltage consumers/accessories.

20 Claims, 5 Drawing Sheets

(56) References Cited

U.S. PATENT DOCUMENTS

| | | | |
|---|---|---|---|
| 2008/0255783 A1* | 10/2008 | Tamai | G01R 31/361 702/63 |
| 2011/0313613 A1* | 12/2011 | Kawahara | H01M 10/441 701/34.4 |
| 2012/0169281 A1 | 7/2012 | Itagaki et al. | |
| 2012/0187759 A1* | 7/2012 | Kamichi | B60L 3/003 307/10.1 |
| 2013/0020863 A1* | 1/2013 | Sugiyama | B60L 11/1868 307/9.1 |
| 2013/0043844 A1* | 2/2013 | Tashiro | B60L 15/2045 320/128 |
| 2013/0134908 A1* | 5/2013 | Sugiyama | B60L 11/14 318/3 |
| 2014/0214251 A1* | 7/2014 | Sugiyama | B60W 20/00 701/22 |
| 2015/0084410 A1* | 3/2015 | Park | B60L 1/00 307/10.1 |
| 2015/0137822 A1* | 5/2015 | Joe | G01R 31/362 324/426 |

* cited by examiner

ELECTRIC CHARGING METHOD FOR A VEHICLE AND ELECTRIC VEHICLE CHARGING DEVICE

CROSS-REFERENCE TO RELATED APPLICATIONS

This application claims foreign priority benefits under 35 U.S.C. §119(a)-(d) to DE 10 2014 209 249.3 filed May 15, 2014, which is hereby incorporated by reference in its entirety.

TECHNICAL FIELD

The present disclosure relates to an electric charging method for a vehicle, such as a battery electric vehicle, electric vehicle, or a plug-in hybrid electric vehicle.

BACKGROUND

Electric vehicles, plug-in hybrid electric vehicles and the like are known as electrically driven vehicles, which are designed to feed an electric machine for the drive of the vehicle from a primary energy store, for example a traction battery or a traction accumulator. Furthermore, vehicles of this type usually also have an additional energy store, for example a lead battery, which supplies electrical energy to low-voltage consumers in the vehicle, for example various electronic control devices and consumers, which provide comfort and convenience functions, and the like.

Vehicle lead batteries are designed to be charged during vehicle operation and to supply electrical consumers with energy while the vehicle is stopped or parked. When lead batteries of this type are also charged continuously, while the vehicle is stopped, this leads to a high water loss of the lead battery, which may lead to a premature failure of the lead battery, if the water loss is not counterbalanced. In addition, long service lives may promote corrosion of the battery plates and/or a development of internal battery short circuits.

Modern electric vehicles or plug-in hybrid electric vehicles usually have a DC voltage of approximately 12V for the low-voltage energy supply of the vehicle. This low voltage in vehicles of this type may be provided by a lead battery as an additional energy store, which is electrically connected to a DC voltage transformer (DC to DC converter) or a rectifier (AC to DC converter). Since the low-voltage energy supply is required for the operation of the different electronic control devices during the charging of the primary energy store or the traction battery of the vehicle, a charging voltage is applied continuously at the lead battery. The charging periods may exceed seven hours daily, and the lead battery is consequently exposed to much longer daily charging times, which may lead to a premature operating failure on account of the water loss, corrosion, or internal battery short-circuits. The situation is also exacerbated by the fact that the traction battery can be charged, for example at a charging socket, generally in an unattended manner and in a closed garage, and by the fact that lead batteries of decreasing function tend to produce hydrogen gas in greater quantities than usual and heat up during charging.

Various types of electric vehicle charging devices, which can charge a primary energy store installed in a vehicle by means of an AC voltage source arranged externally of the vehicle are known. In one such device, an AC to DC converter converts the AC voltage externally of the vehicle into a DC voltage and provides this to consumers in the vehicle while the primary energy store is charged by the external AC voltage source. An auxiliary energy store is also provided that can supply the consumers with electrical energy. While the primary energy store is charged by the external voltage source, a diode connected in series with the auxiliary energy store prevents a charging of the auxiliary energy store to increase the charging efficiency when charging the primary energy store. However, the auxiliary energy store can be discharged to supply the consumers in the vehicle. During the charging of the primary energy store, however, the discharge of the additional energy store is prevented in that a control device controls the output voltage of the AC to DC converter in such a way that the diode is operated in a blocking state.

In another known electrical circuit arrangement of a hybrid electric vehicle, a low-voltage battery in a low-voltage supply network of the vehicle can be separated from a high-voltage supply network including a high-voltage battery for driving the vehicle by an associated switch. The switch may be closed to charge the high-voltage battery using the low-voltage battery. Similarly, a low-voltage battery may be charged from a high-voltage battery.

Representative strategies for charging a low-voltage battery in an electric or hybrid electric vehicle are disclosed in U.S. Pat. No. 8,186,466 B2; US 2007/0210743 A1; and US 2012/0169281 A1, for example.

SUMMARY

Various embodiments according to the present disclosure provide an electric charging method and an electric charging device for a vehicle, such as a battery electric vehicle, electric vehicle, or a plug-in hybrid electric vehicle, that protect an energy store, such as a lead battery, against damage as a result of extended or prolonged charging when the vehicle is electrically connected to an energy source arranged externally of the vehicle that supplies energy to an electric supply network inside the vehicle. In addition, various embodiments ensure that the energy store does not fall below a predetermined state of charge to ensure the proper electrical function of the energy store.

It is noted that the features specified individually in the claims can be combined with one another in any technically expedient manner and can depict further embodiments that may not be explicitly described or illustrated. The description additionally characterizes and specifies the claimed subject matter in conjunction with the figures.

In one embodiment, a method for charging a vehicle having a traction battery, a low-voltage battery, and a DC converter includes, while connected to an external electric source, controlling DC converter output voltage, via an electronic control device, such that no current flows to or from the low-voltage battery when an associated low-voltage battery state-of-charge exceeds a threshold, and controlling the DC converter output voltage, via the electronic control device, to flow current to the low-voltage battery otherwise. In another embodiment, a charging device on-board a vehicle having first and second batteries includes a converter that converts electricity from an external source to a low DC voltage and selectively powers low-voltage consumers while connected to the external source, and an electronic control device configured to effectively decouple the second battery from the converter during charging of the first battery by the external source in response to a second battery state-of-charge exceeding a threshold.

In accordance with various embodiments, a method for charging an electric primary energy store, for example a traction battery, installed in a vehicle, such as a battery electric vehicle, an electric vehicle, or a plug-in hybrid electric vehicle, using an electric energy source arranged externally of the vehicle comprises converting an electric voltage provided by the external energy source into a low DC voltage using a converter, such as a DC voltage transformer or a rectifier, and feeding the low DC voltage to low-voltage consumers of the vehicle while the primary energy store is charged by the external energy source.

Embodiments may also include a system or method where a state of charge of an additional energy store, for example a lead battery, which stores electrical energy for the electrical supply of the low-voltage consumers, is determined during the charging of the primary energy store by the external energy source. If the state of charge is sufficient for proper electrical supply of the low-voltage consumers, the additional energy store is electrically effectively decoupled from the low DC voltage and the low-voltage consumers using an electronic control device during the charging of the primary energy store by the external energy source, such that the additional energy store can be neither charged by the low DC voltage nor discharged by the low-voltage consumers. If, by contrast, the state of charge is insufficient for proper electrical supply of the low-voltage consumers, the additional energy store is electrically effectively coupled to the low DC voltage using the electronic control device during the charging of the primary energy store by the external energy source, such that the additional energy store can be charged by the low DC voltage. A DC voltage used conventionally in vehicles for the electrical supply of low-voltage consumers, such as various electronic control devices and consumers, which provide comfort and convenience functions, in the range of approximately 12 V is understood to be low DC voltage.

In one embodiment, a method ensures that the additional energy store, such as a lead battery, is protected against damage caused by extended or prolonged charging, when the vehicle is electrically connected to an energy source arranged externally of the vehicle, which supplies energy to an electrical supply network inside the vehicle. In addition, the method prevents the additional energy store from falling below a predetermined state of charge, at which the proper electrical function of said additional energy store for the electrical supply of the low-voltage consumers in the vehicle is no longer ensured.

In accordance with an advantageous embodiment of the disclosure, the control device is designed to electrically decouple the additional energy store using a zero current control in which case the control device controls an output voltage of the converter in such a way that a current flow into and out from the additional energy store is zero. In other words, the control device raises the output voltage as soon as a current flow from the additional energy store occurs, to reduce or prevent discharging of the additional energy store, and lowers the output voltage as soon as a current flow into the additional energy store occurs, to effectively prevent charging of the additional energy store. In this way the additional energy store is separated "virtually" from the low-voltage consumers of the vehicle and from the low DC voltage and is thus electrically effectively decoupled while the primary energy store can be charged by the external energy source. The zero current control can be performed for example using a standard P-I controller or by conventional adaptive control.

In accordance with a further advantageous embodiment, the control device is designed to control an output voltage of the converter in such a way that a current flows into the additional energy store to electrically couple the additional energy store to the converter when charging of the energy store is desired.

Embodiments according to the disclosure enable a particularly economical implementation of the solution concept because the additional energy store can be electrically decoupled from and/or coupled to the low-voltage consumers of the vehicle and the low DC voltage merely by adapting the output voltage of the converter by means of the electronic control device.

The current flow into and out from the additional energy store may be determined by a current sensor connected in series with the additional energy store, with a determined value of the current sensor provided to the control device and used to effectively couple or decouple the additional energy store to the low-voltage consumers of the vehicle and the low DC voltage.

In various advantageous embodiments, the state of charge of the additional energy store is determined by comparing during the zero current control an average value of the output voltage of the converter controlled by the control device with a predetermined no-load voltage limit value of the additional energy store. The state of charge of the additional energy store is then assessed to be insufficient for proper electrical supply of the low-voltage consumers if the state of charge falls below the no-load voltage limit value. Otherwise, the state of charge of the additional energy store is assessed to be sufficient. This may advantageously dispense with additional measurement sensors for determining the state of charge of the additional energy store, which simplifies the construction of the electric vehicle charging device for carrying out the charging method and reduces the associated production costs.

In some embodiments, a state of charge sensor, for example a conventional battery sensor arranged in the pole recess of the additional energy store, is used to sense the state of charge of the additional energy store, in particular a no-load voltage value of the additional energy store, which is provided to the control device. The voltage state or state of charge determined continuously by the state of charge sensor is then compared during the decoupling of the additional energy store from the low-voltage consumers and the low DC voltage with a predetermined no-load voltage limit value or state of charge limit value of the additional energy store. The state of charge of the additional energy store is then assessed to be insufficient for proper electrical supply of the low-voltage consumers when said state of charge falls below the corresponding limit value. Otherwise, the state of charge of the additional energy storage is assessed to be sufficient.

In other advantageous embodiments, a relay establishes or separates the electrical connection of the additional energy store to the low-voltage consumers of the vehicle and the low DC voltage. To this end the relay, in order to electrically decouple the additional energy store, is controlled by the control device in such a way that the additional energy store is galvanically separated from the low-voltage consumers and the low DC voltage by opening the relay and, in order to electrically couple the additional energy store, is connected to the low DC voltage by closing the relay.

Embodiments may also include a charging device for a vehicle, such as a battery electric vehicle, an electric vehicle, or a plug-in hybrid electric vehicle, for charging an electric primary energy store, for example a traction battery, installed in the vehicle, using an electrical energy source arranged externally of the vehicle. The charging device may include a converter that converts a voltage provided by the external energy source into a low DC voltage and feeds the low DC voltage to low-voltage consumers of the vehicle during the charging of the primary energy store by the external energy source. The vehicle may include an electric additional energy store, for example a lead battery, for storing electrical energy for the electrical supply of the low-voltage consumers. The charging device may include an electronic control device designed to electrically effectively decouple the additional energy store from the low DC voltage and the low-voltage consumers during the charging of the primary energy store by the external energy source if a state of charge of the additional energy store is sufficient for proper electrical supply of the low-voltage consumers, and to electrically effectively couple the additional energy store to the low DC voltage during the charging of the primary energy store by the external energy source if the state of charge of the additional energy store is insufficient for proper electrical supply of the low-voltage consumers. As has already been mentioned further above, a low DC voltage in the vehicle sector is understood in particular to be a DC voltage in the region of approximately 12 V, as is used conventionally for the electrical supply of low-voltage consumers in the vehicle, for example electric control devices and consumers providing comfort and convenience functions.

With the charging device according to various embodiments, it can be ensured that the additional energy store, such as a lead battery, is protected against damage caused by prolonged, extended, or permanent charging, when the vehicle is electrically connected to an energy source arranged externally of the vehicle, which supplies energy to an electrical supply network inside the vehicle. In addition, with the charging device according to various representative embodiments, it is possible to prevent the additional energy store from falling below a critical state of charge, at which the proper electrical function of said additional energy store for the electrical supply of the low-voltage consumers in the vehicle is no longer ensured.

In accordance with other advantageous embodiments, a current sensor is provided to measure or otherwise determine a flow of current into and out from the additional energy store and provide the control device with a sensed or otherwise determined value. The control device is designed to carry out a zero current control based on the determined value of the current sensor. In this case the control device controls an output voltage of the converter in such a way that the flow of current into and out from the additional energy store is zero, such that the additional energy store is "virtually" separated and thus electrically effectively decoupled from discharge by the low-voltage consumers of the vehicle and the low DC voltage while the primary energy store can be charged by the external energy source. The zero current control can be performed, for example, by a standard proportional-integral (P-I) controller or by conventional adaptive control. The control device in this embodiment is designed, in order to electrically couple the additional energy store on the basis of the determined value of the current sensor, to control the output voltage of the converter in such a way that current flows into the additional energy store and the additional energy store can be charged accordingly.

Alternatively to the use of the current sensor, a further advantageous embodiment provides a relay, with which the additional energy store is electrically connected to the low-voltage consumers and the low DC voltage. Here, the control device is designed, in order to electrically decouple the additional energy store, to switch the relay into an open state, in which the additional energy store is galvanically separated from the low-voltage consumers and the low DC voltage, and, in order to electrically couple the additional energy store, to switch the relay into a closed state, in which the additional energy store is galvanically connected to the low DC voltage.

In accordance with further advantageous embodiments, the additional energy store is a lead battery and/or the converter is a DC voltage transformer or a rectifier, and/or a state of charge sensor, for example a conventional battery sensor arranged in the pole recess of the additional energy store, is provided, with which the state of charge of the additional energy store is determined and a determined value of the state of charge sensor, in particular a no-load voltage value of the additional energy store, is provided to the control device, on the basis of which value the state of charge of the additional energy store is assessed to be sufficient or insufficient, as has already been described herein in conjunction with the charging method. A converter formed as a direct voltage transformer is connected on the input side preferably to a conventional high DC voltage network inside the vehicle, which in particular serves for the electrical supply of a traction battery of the vehicle, whereas a converter formed as a rectifier is connected on the input side preferably to a conventional AC voltage network arranged externally of the vehicle.

Further features and advantages will emerge from the following description of representative embodiments, which are not to be understood as limiting, which will be explained hereinafter in greater detail with reference to the drawings.

DETAILED DESCRIPTION

As required, detailed embodiments of the present disclosure are described herein; however, it is to be understood that the disclosed embodiments are merely exemplary and the claimed subject matter may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In the different figures, parts having equivalent function are always provided with the same reference signs, such that these will generally also only be described once.

Figure 1:
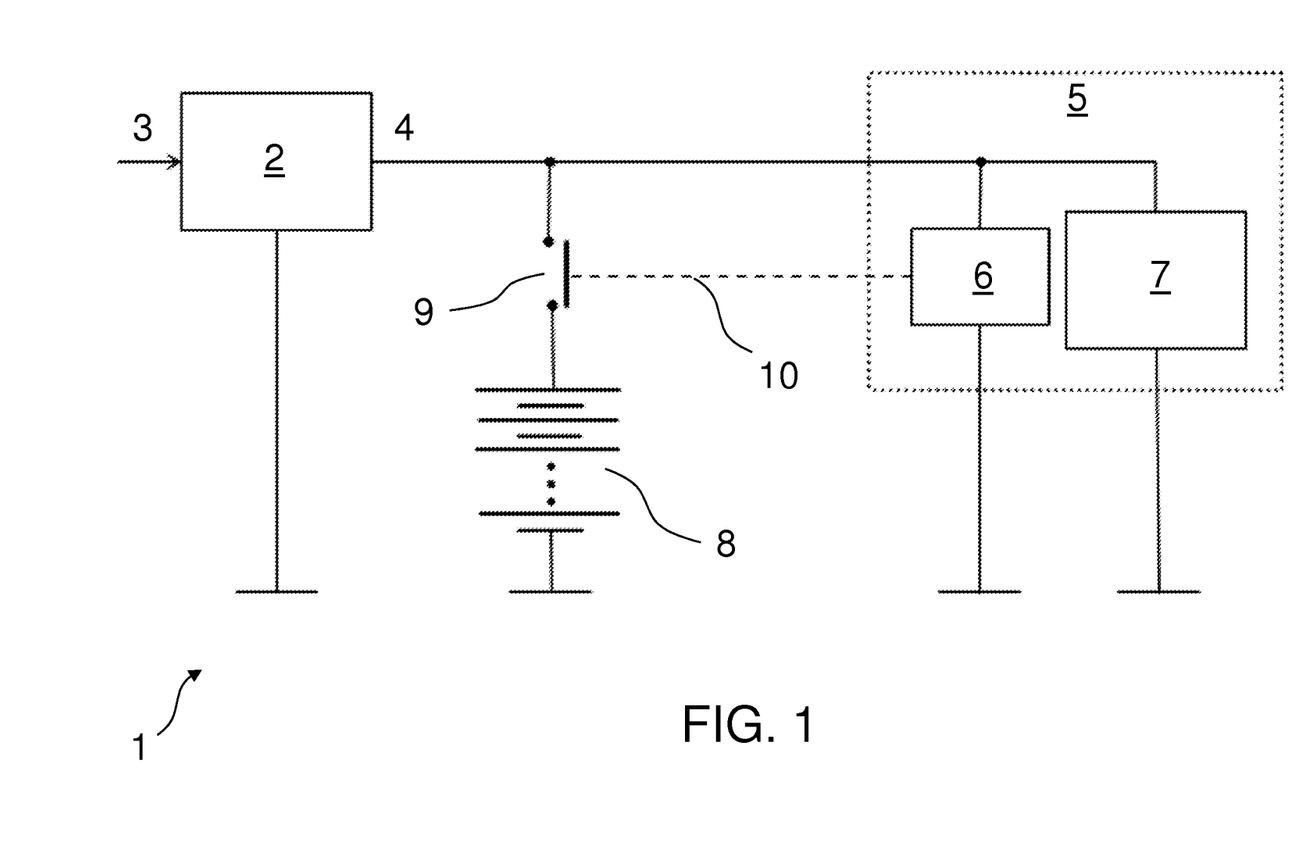
FIG. 1 schematically shows a circuit diagram of a first exemplary embodiment of an electric charging device according to the disclosure, FIG. 2 schematically shows a flow diagram of a first exemplary embodiment of an electric charging method according to the disclosure, FIG. 3 schematically shows a circuit diagram of a second exemplary embodiment of an electric charging device according to the disclosure, FIG. 4 schematically shows a flow diagram of a second exemplary embodiment of an electric charging method according to the disclosure, and FIG. 5 schematically shows a flow diagram of a third exemplary embodiment of an electric charging method according to the disclosure.

FIG. 1 schematically shows a circuit diagram of a first exemplary embodiment of an electric charging device 1 according to the disclosure for a vehicle, in particular for a battery electric vehicle or electric vehicle or a plug-in hybrid electric vehicle, for charging an electric primary energy store (not illustrated), in particular a traction battery, installed in the vehicle, using an electric energy source (likewise not illustrated) arranged externally of the vehicle. Furthermore the charging device 1 illustrated in FIG. 1 comprises a converter 2 for converting a voltage provided by the external energy source into a low DC voltage. An input side 3 of the converter 2 can be fed either directly the voltage provided by the external energy source, in particular an AC voltage, or a high DC voltage already converted inside the vehicle from the external energy source, which voltage for example is used to charge the primary energy store, in particular the fraction battery of the vehicle. In the first case the converter is preferably formed as a DC voltage transformer, which converts an input-side high DC voltage into the low DC voltage on the output side 4 of said converter. In the second case the converter is preferably formed as a rectifier, which converts an input-side AC voltage into the low DC voltage applied at the output 4 of the converter 2. In the exemplary embodiments described herein, a DC voltage of approximately 12 V in particular is understood to be low-voltage.

As can also be inferred from FIG. 1, the low DC voltage provided by the converter 2 is fed to low-voltage consumers 5 of the vehicle. By way of example, various electronic control devices and consumers, which provide comfort and convenience functions of the vehicle, and the like are understood to be low-voltage consumers 5. In FIG. 1 an electronic control device 6 and the other low-voltage consumers 7 of the vehicle are illustrated explicitly by way of example as low-voltage consumers 5.

Whilst the primary energy store is charged by the external energy source, either the (AC) voltage provided by the external energy source is applied directly at the input 3 of the converter 2, or the high DC voltage of the high DC voltage supply network inside the vehicle is applied at said input, such that the low-voltage consumers 5 are supplied with electrical energy during the charging of the primary energy store via the converter 2, as can be seen in FIG. 1.

Furthermore, an electrical additional energy store 8 can be inferred from FIG. 1, which serves to store electrical energy for the electrical supply of the low-voltage consumers 5 as soon as the converter 2 no longer supplies electrical energy to the low-voltage consumers. The additional energy store 8 is formed as a conventional lead battery in the exemplary embodiment illustrated in FIG. 1.

The electronic control device 6 already mentioned is designed in the case of the charging device 1 illustrated in FIG. 1 to electrically effectively decouple the additional energy store 8 from the low DC voltage and the low voltage consumers 5 during the charging of the primary energy store by the external energy source if a state of charge of the additional energy store 8 is sufficient for proper electrical supply of the low-voltage consumers 5, and to electrically effectively couple the additional energy store 8 to the low DC voltage during the charging of the primary energy store by the external energy source if the state of charge of the additional energy store 8 is insufficient for proper electrical supply of the low-voltage consumers 5.

To this end, the exemplary embodiment of the charging device 1 illustrated in FIG. 1 also comprises a relay 9, which in the closed state thereof, galvanically connects the additional energy store 8 to the low DC voltage and the low-voltage consumers 5, and, in the open state thereof, galvanically separates the additional energy store from these. The relay 9 is electrically connected by means of a control line 10 to the control device 6, which is in turn designed to switch the relay 9 into an open state in order to electrically decouple the additional energy store 8, and to switch the relay 9 into a closed state in order to electrically couple the additional energy store 8.

In order to detect the state of charge of the additional energy store 8, a state of charge sensor (not illustrated in FIG. 1), in particular a conventional battery sensor housed in the pole recess of a lead battery, can be used. This sensor can provide the control device 6 with a determined value, in particular a no-load voltage value of the additional energy store 8, on the basis of which value the control device 6 can determine a state of charge of the additional energy store 8 as sufficient or insufficient for proper electrical supply of the low-voltage consumers 5.

As can be seen in FIG. 1, relay 9 controlled by the control device 6 is provided for the coupling and decoupling of the additional energy store 8 to/from the low DC voltage and the low-voltage consumers 5. The converter 2 is always activated during the charging of the primary energy store, that is to say while the vehicle is electrically connected to the external energy source, such that the low-voltage consumers 5 are electrically supplied during this time by the converter 2.

Figure 2:
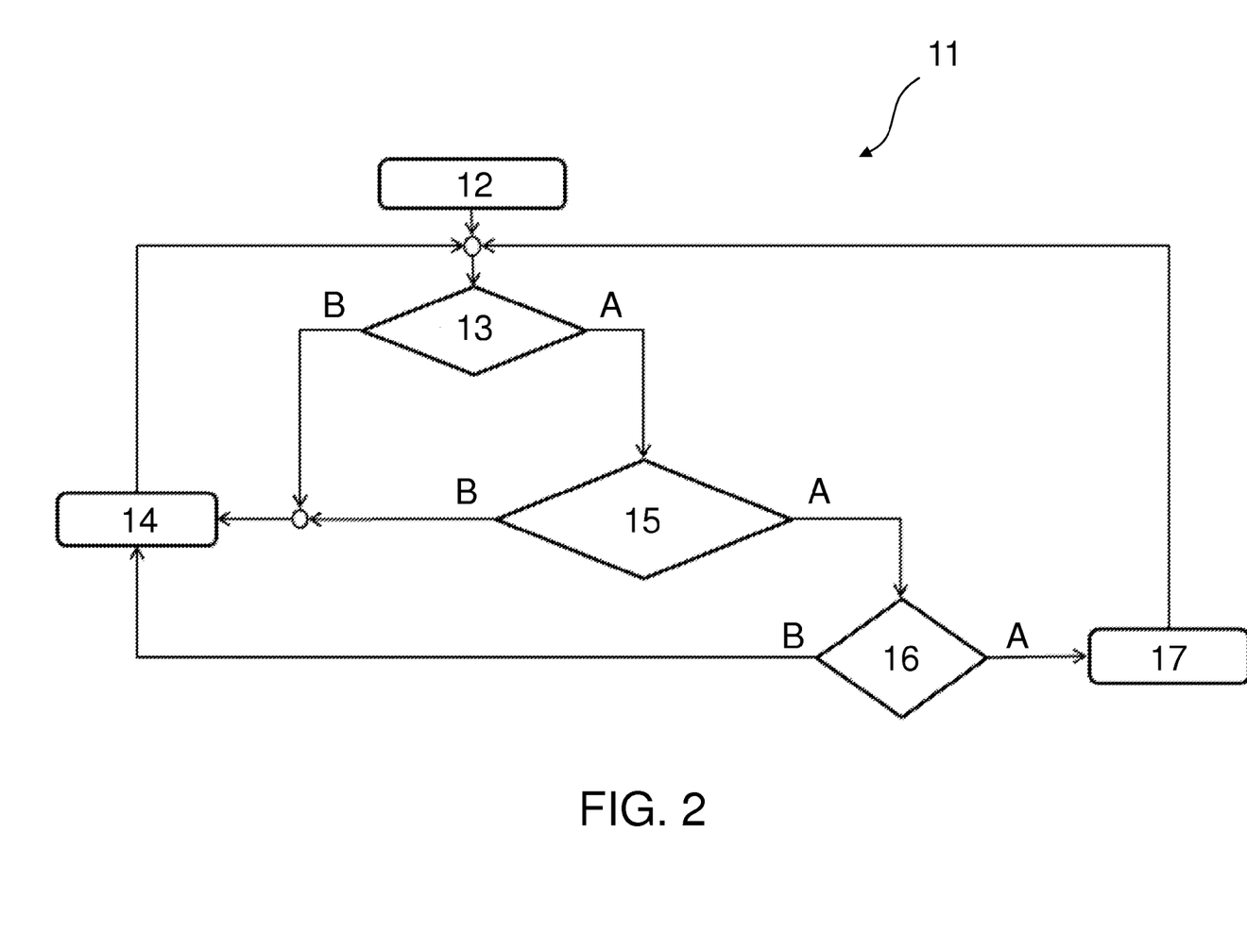

FIG. 2 illustrates a flow diagram of a first exemplary embodiment of an electric charging method 11 according to the disclosure. In step 12 the charging method 11 is started, as soon as the vehicle is electrically connected to the energy source arranged externally of the vehicle for charging the primary energy store of the vehicle. The activation of the charging method 11 can be triggered for example by plugging a plug of the vehicle into a socket of the external energy source or for example by activating another control device, which essentially controls the charging of the primary energy store of the vehicle.

In step 13 it is checked whether the vehicle is electrically connected to the energy source arranged externally of the vehicle. If the vehicle is not connected to the external energy source (branch B), the additional energy store 8 is electrically effectively coupled to the low-voltage consumers 5, for example the relay 9 illustrated in FIG. 1 in step 14 is closed as a result of a corresponding control signal of the control device 6 transmitted via the control line 10, such that the additional energy store 8 can supply the low-voltage consumers 5 with electrical energy when the vehicle is not connected to the external energy source.

If, in step 13, it is determined that the vehicle is connected to the external energy source, the method 11 continues with the branch A and checks in step 15 whether the converter 2 is active, i.e. converts the voltage provided from the external energy source into the low DC voltage for supplying low-voltage consumers 5 during the charging of the primary energy store. If the converter is not active (branch B), the method 11 continues with step 14, in which the additional energy store 8 is electrically effectively coupled to the low-voltage consumers 5.

If, in step 15, it is determined that the converter 2 is active, the method 11 continues with step 16, in which the state of charge of the additional energy store 8 is checked. If the state of charge of the additional energy store 8 is insufficient for proper electrical supply of the low-voltage consumers 5 (branch B), the method 11 continues with step 14, in which the additional energy store 8 is electrically effectively coupled to the low-voltage consumers 5. Since in this case the converter 2 is active and supplies the low-voltage consumers 5 with electrical energy, this means that the additional energy store 8 is electrically effectively coupled to the low DC voltage applied at the output 4 of the converter 2. The additional energy store 8 can be charged accordingly.

If, in step 16, it is determined that the state of charge of the additional energy store 8 is sufficient for proper electrical supply of low-voltage consumers 5 (branch A), the method 11 continues with step 17, in which the additional energy store 8 is electrically effectively decoupled from the low-voltage consumers 5 and thus from the load DC voltage of the active converter 2. For the exemplary embodiment of the charging device 1 illustrated in FIG. 1, this means that the relay 9 is opened by a corresponding control signal of the control device 6 transmitted via the control line 10.

After the steps 14 and 17 the method 11 illustrated in FIG. 2 returns to step 13.

Figure 3:
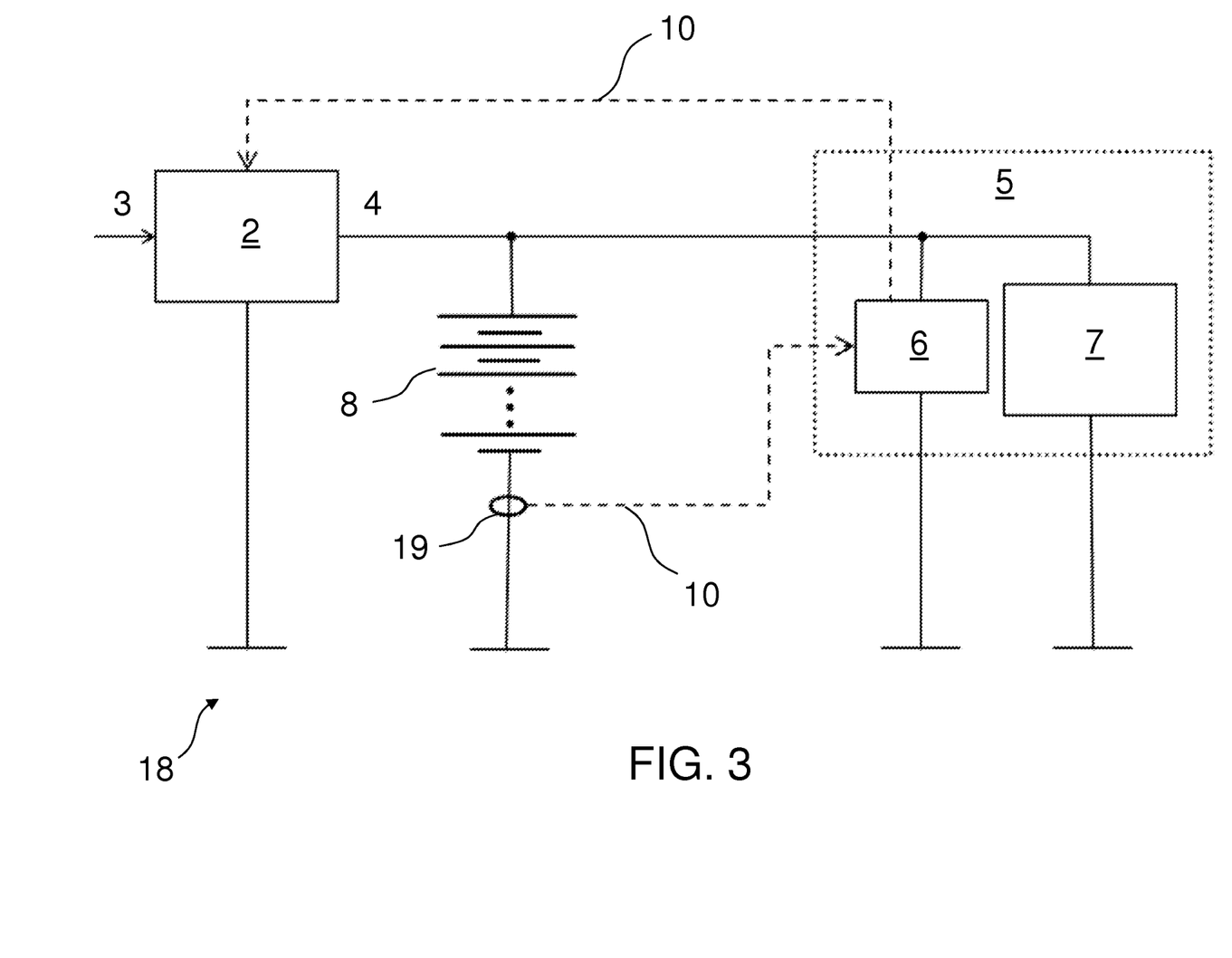

FIG. 3 illustrates a circuit diagram of a second exemplary embodiment of an electric charging device 18 according to the disclosure. The charging device 18 differs essentially from the charging device 1 illustrated in FIG. 1 in that, instead of the relay 9, a current sensor 19 is connected in series with the additional energy store 8. The additional energy store 8 is thus always galvanically connected to the low DC voltage applied at the output 4 of the converter 2 and to the low-voltage consumers 5 of the vehicle. The current sensor 19 is intended to determine a flow of current into and out from the additional energy store 8 and to provide the control device 6 with a determined value in this regard via the lower control line 10 illustrated in FIG. 3. In the exemplary embodiment of the charging device 18 illustrated in FIG. 3 the control device 6 is designed to perform a zero current control in order to electrically decouple the additional energy store from the low DC voltage and low-voltage consumers 5 on the basis of the determined value provided by the current sensor 19. In this case the control device 6 controls the output voltage of the converter 2 in such a way that the flow of current into and out from the additional energy store 8 is zero. In other words the control device 6 raises the output voltage of the converter 2 when a flow of current, determined by the current sensor 19, from the additional energy store 8 to the low-voltage consumers 5 of the vehicle is determined, i.e. the additional energy store 8 would discharge, and lowers the output voltage of the converter 2 when a flow of current into the additional energy store 8 is determined, i.e. the additional energy store 8 would be charged. In the case of the charging device 18 illustrated in FIG. 3 the output voltage of the converter 2 is set at the converter 2 by the control device 6 via a second control line 10 illustrated at the top in FIG. 3.

The control device 6 is also designed in the exemplary embodiment of the charging device 18 illustrated in FIG. 3, in order to electrically couple the additional energy store 8 to the low DC voltage applied at the output 4 of the converter 2, to control the output voltage of the converter 2 on the basis of the determined value provided by the current sensor 19, in such a way that the current flows into the additional energy store 8 and the additional energy store 8 is thus charged.

The zero current control is preferably performed using a standard PI controller or using conventional adaptive control.

To determine the state of charge of the additional energy store 8, a state of charge sensor (not illustrated in FIG. 3), such as a conventional battery sensor, may be housed in the pole recess of a lead battery. This can provide the control device 6 with a determined value, in particular a no-load voltage value of the additional energy store 8, on the basis of which value the control device 6 can determine a state of charge of the additional energy store 8 and whether it is sufficient or insufficient for proper electrical supply of low-voltage consumers. The converter 2 is always activated during the charging of the primary energy store, i.e. while the vehicle is electrically connected to the external energy source, such that there is always an electrical supply of the low-voltage consumers via the converter 2 during this time.

The exemplary embodiment of the charging method 11 illustrated in FIG. 2 can also be carried out with the charging device 18 illustrated in FIG. 3. For this purpose the zero current control performed by the control device 6 is activated in step 17 illustrated in FIG. 2 and is deactivated in step 14, in which the additional energy store 8 is electrically effectively coupled to the low-voltage consumers 5 of the vehicle and therefore also to the low DC voltage applied at the output 4 of the converter 2.

A further significant advantage of the previously described zero current control lies in the fact that the output voltage of the converter 2 controlled by the control device 6, i.e. the voltage that is applied between the connections of the additional energy store 8 during the zero current control (terminal current), can be used to assess the state of charge of the additional energy store 8, as the no-load voltage of the additional energy store 8 is related to the state of charge. It is then possible to dispense with a dedicated state of charge sensor provided for this purpose.

Figure 4:
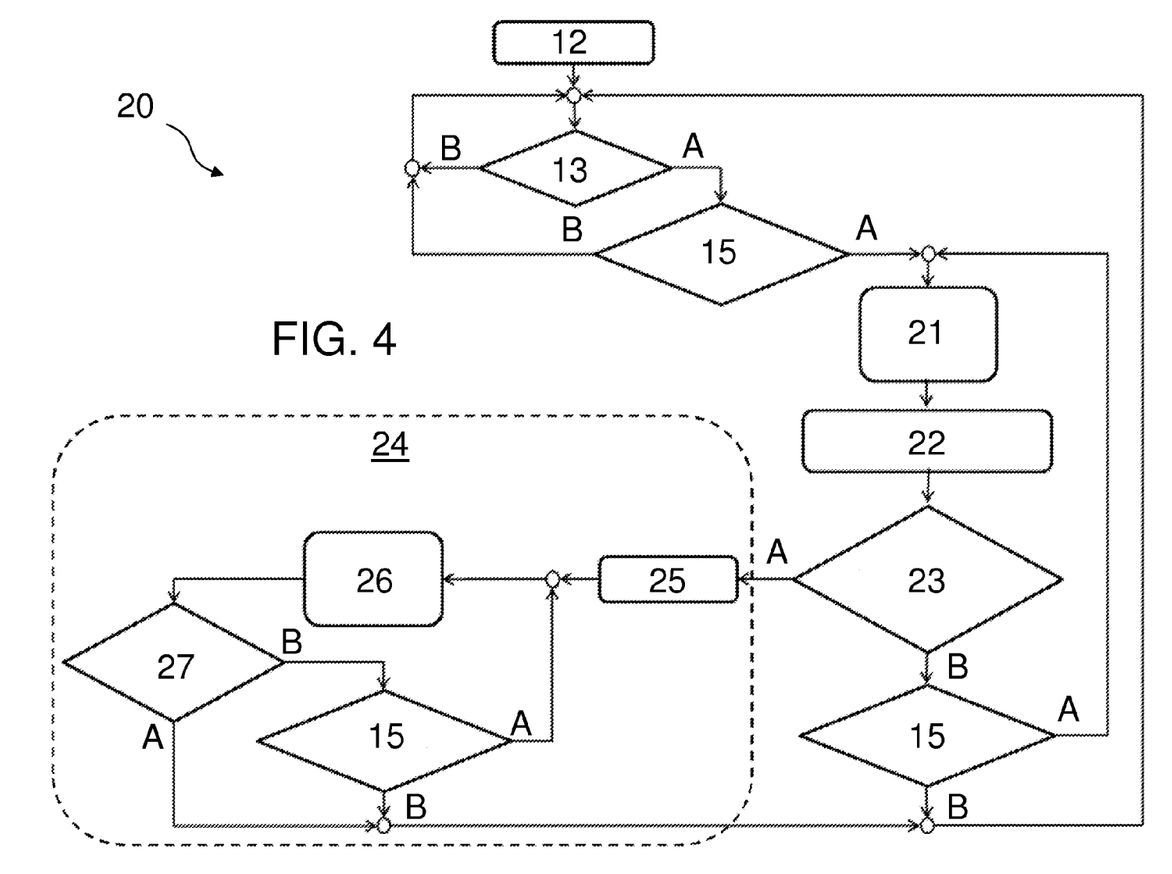

FIG. 4 illustrates a flow diagram of a second exemplary embodiment of an electric charging method 20 according to the disclosure. Steps 12, 13 and 15 have already been described in conjunction with the charging method 11 illustrated in FIG. 2. In step 21 the previously described zero current control is activated in order to electrically effectively decouple the additional energy store 8 from the low DC voltage and the low-voltage consumers 5. In step 22 an average value of the output voltage of the converter 2 controlled by the control device 6 is then determined during the zero current control. In the case of low load currents of the additional energy store 8, which is the situation provided during the zero current control, it can be assumed that the output voltage of the converter 2 is equal to the terminal voltage (=no-load voltage during the zero current control) of the additional energy store 8.

In step 23 the previously determined output voltage average value of the converter 2 is compared with a predetermined no-load voltage limit value of the additional energy store 8. If the output voltage average value is greater than the no-load voltage limit value (branch B), the state of charge of the additional energy store 8 is sufficient for proper electrical supply of the low-voltage consumers 5, and the method 20 continues with the subsequent step 15, in which it is again checked whether the converter 2 is activated. If the converter 2 is activated (branch A), the method 20 returns to step 21. If the converter 2 is not activated (branch B), the method returns to step 13. In both cases the subsequent steps already described are repeated.

If, in step 23, it is determined that the output voltage average value is not greater than the no-load voltage limit value (branch A), the state of charge of the additional energy store 8 is insufficient for proper electrical supply of the low-voltage consumers 5, such that the method 20 then performs a charging process 24 of the additional energy store 8 for a calibrated period of time. To this end the current time value is firstly stored in step 25. Then, what is known as a Z-curve charging process of the additional energy store 8 is started in step 26. The charging voltage to be applied at the additional energy store 8, in the exemplary embodiment described herein a lead battery, is dependent on temperature in order to fully charge each battery cell. The charging voltage to be applied depending on temperature in order to fully charge the additional energy store 8 is defined by a characteristic curve, which is referred to herein as a Z-curve. The corresponding charging voltage is applied at the additional energy store 8, as already explained further above, by controlling the output voltage of the converter 2 accordingly by means of the control device 6.

The charging process is performed for a predetermined period of time, and it is checked in step 27 whether this period of time has been exceeded. Provided the charging period is not exceeded (branch B), the charging process 26 is performed, provided in step 15 it is determined that the converter 2 is activated (branch A of step 15). If it is determined in step 27 that the charging period has been exceeded (branch A of step 27) or if it is determined in step 15 that the converter 2 is deactivated, the method returns to step 13, from where the steps subsequent to step 13 are repeated.

If the additional energy store 8 after the predetermined charging period still does not have a sufficient state of charge and the vehicle is still connected to the external energy source and the converter 2 is activated, a renewed charging process 24 can be initiated, such that the state of charge of the additional energy store 8 is controlled adaptively in such a way that it has at least one such minimal state of charge, which ensures proper electrical supply of the low-voltage consumers 5 of the vehicle.

Figure 5:
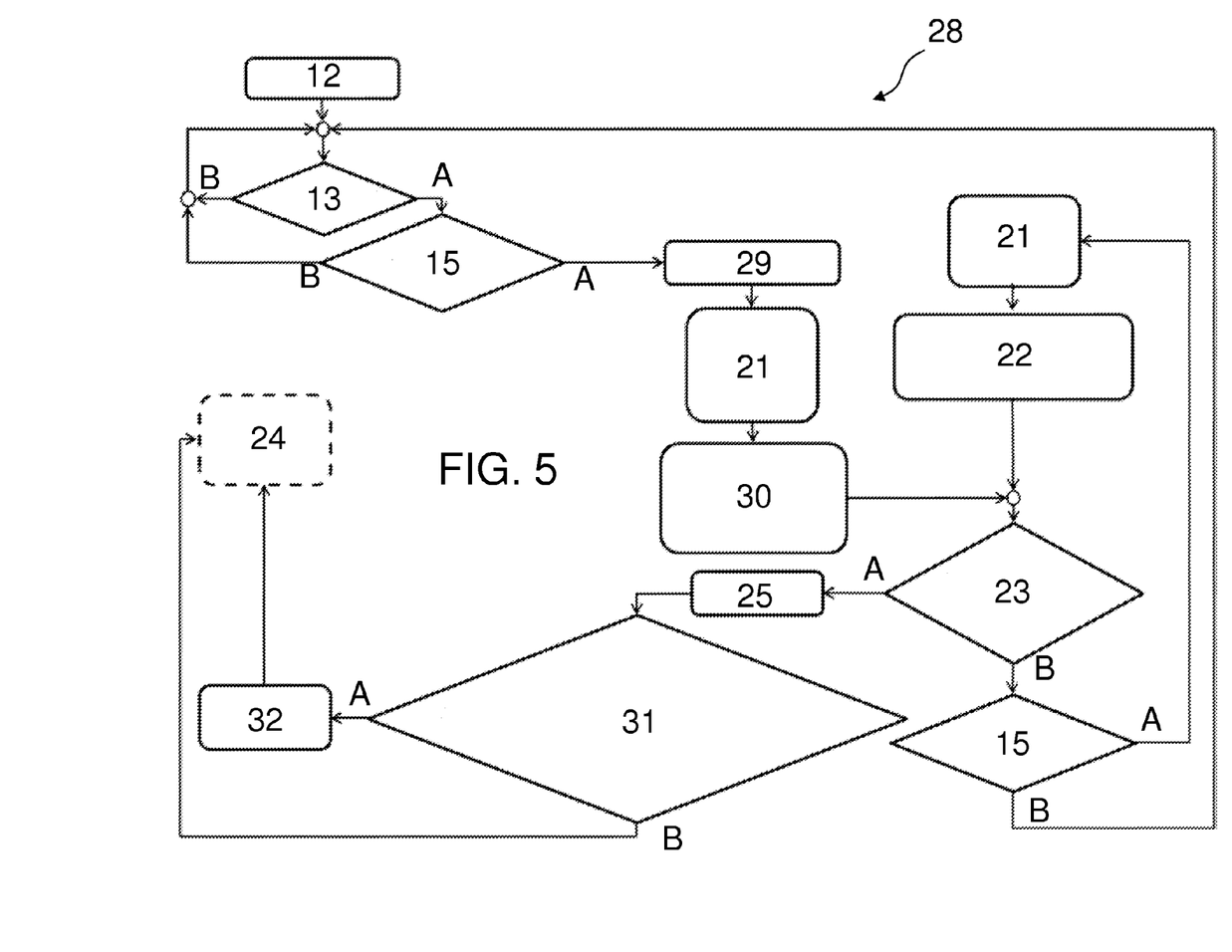

FIG. 5 illustrates a flow diagram of a third exemplary embodiment of an electric charging method 28 according to the disclosure. In this charging method 28, additionally to the charging method 20 illustrated in FIG. 4, internal short circuits of the additional energy store 8, in particular a lead battery, can also be determined with the aid of the average value of the output voltage of the converter 2, already explained in conjunction with FIG. 4, whilst the zero current control is performed.

Once the vehicle has been connected to the external energy source (step 13, branch A) and the converter 2 has been activated (step 15, branch A), the current time value is firstly stored in step 29 as initial time value, then the zero current control is activated in step 21, and lastly in step 30 an initial value of the average output voltage of the converter 2 is stored, which corresponds to the terminal voltage of the additional energy store 8 during the zero current control.

When the output voltage average value of the converter 2 falls below the predetermined no-load voltage limit value, which indicates an insufficient state of charge of the additional energy store 8 (step 23, branch A), the current time value is stored in step 25 and then in step 31 a voltage gradient over time is calculated and compared with a predetermined, calibrated gradient limit value. The voltage gradient over time is calculated from the difference from the initial value of the average output voltage of the converter 2 determined in step 30 and the current output voltage average value of the converter 2 divided by the difference from the current time value determined in step 25 and the initial time value determined in step 29. This quotient therefore represents the decrease over time of the average output voltage value of the converter 2 in V/s during the zero current control since the start of the zero current control (first-time execution of step 21).

When the voltage gradient over time calculated in step 31 exceeds the gradient limit value (branch A), it is assumed that an internal short circuit is present in the additional energy store 8. This short circuit state is stored in step 32. The stored short circuit state can be used for example for optical and/or acoustic display of a signal on an instrument panel of the vehicle and/or can be provided to an individual servicing the vehicle for readout from a non-volatile memory in order to indicate that the additional energy store 8 is to be checked and possibly replaced.

Once the voltage gradient over time has been calculated in step 31, the charging process 24 of the additional energy store 8 already described in conjunction with FIG. 4 is performed in step 24, since in step 23 it was determined that the average output voltage of the converter 2 had fallen below the predetermined no-load voltage limit value of the additional energy store 8 (branch A).

The electric charging method according to the disclosure and the electric charging device according to the disclosure have been explained in greater detail on the basis of exemplary embodiments illustrated in the figures. The charging method and also the charging device, however, are not limited to the embodiments described herein, but also comprise equivalent further embodiments. In particular the charging method and the charging device can also be applied to vehicles other than the battery electric vehicles or electric vehicles or plug-in hybrid electric vehicles mentioned previously herein, such as aircraft or boats, in which a permanent charging of an energy store, such as a battery, may lead to damage to the energy store, when the vehicle is electrically connected to an energy source arranged externally of the vehicle and the electrical supply network inside the vehicle is electrically supplied by this energy source. This may be the case for example with an aircraft that is stationary at a gate or in a hangar or with a boat that remains over a relatively long period of time at a harbor facility.

In addition, the charging method according to the disclosure and the charging device according to the disclosure are not limited to the use with lead batteries as an additional energy store, but also comprise any type of energy store that can sustain damage as a result of extended, prolonged, or permanent charging.

In a preferred embodiment the electric charging method and the electric charging device according to the disclosure are used in a vehicle, in particular a battery electric vehicle, an electric vehicle, or a plug-in hybrid electric vehicle, for protection of a lead battery, provided as an additional energy store in the vehicle when the vehicle is electrically connected to an energy source arranged externally of the vehicle in order to electrically supply an electric supply network inside the vehicle to reduce or prevent damage to the additional energy store associated with prolonged, extending, or permanent charging.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for charging a vehicle, comprising:
   controlling DC converter output voltage, via an electronic control device, while connected to an external electric source such that zero current flows to and from an auxiliary battery in response to a state of charge of the auxiliary battery exceeding a threshold; and
   controlling the DC converter output voltage, via the electronic control device, to flow current to the auxiliary battery otherwise.

2. The method of claim 1 wherein the vehicle includes a current sensor associated with the auxiliary battery and wherein controlling DC converter output voltage comprises controlling the DC converter output voltage in response to a signal received from the current sensor.

3. The method of claim 1 further comprising:
controlling the DC converter output voltage so current flows to the auxiliary battery in response to an average value of an output voltage of the DC converter while no current flows to the low-voltage battery exceeding a no-load voltage limit threshold associated with the auxiliary battery.

4. The method of claim 1 wherein the DC converter comprises an AC-to-DC converter.

5. The method of claim 1 wherein the auxiliary battery remains electrically connected to the DC converter when zero current is flowing to the auxiliary battery.

6. The method of claim 1 wherein the state of charge of the auxiliary battery is determined by the electronic control device in response to a signal provided by an associated auxiliary battery voltage sensor.

7. The method of claim 1 wherein the electronic control device implements a proportional-integral controller to control the DC converter output voltage.

8. The method of claim 1 wherein the vehicle includes a relay in communication with the electronic control device, the method further comprising controlling the relay in response to the state of charge of the auxiliary battery to control current flow to and from the auxiliary battery.

9. A charging device on-board a vehicle having first and second batteries, comprising:
a converter that converts electricity from an external source to a low DC voltage and selectively powers low-voltage consumers while connected to the external source; and
an electronic control device configured to effectively decouple the second battery from the converter during charging of the first battery by the external source in response to a second battery state of charge exceeding a threshold.

10. The charging device of claim 9, the electronic control device being configured to effectively couple the second battery to the converter during the charging of the first battery by the external energy source in response to the state of charge of the second battery not exceeding the threshold.

11. The charging device of claim 9, the electronic control device effectively decoupling the second battery from the converter by controlling converter output voltage.

12. The charging device of claim 11, the electronic control device effectively decoupling the second battery from the converter by increasing and decreasing converter output voltage in response to changes in voltage of the second battery.

13. The charging device of claim 11, the electronic control device effectively decoupling the second battery from the converter by controlling converter output voltage so that zero current flows to and from the second battery.

14. The charging device of claim 9 wherein the electronic control device controls the converter output voltage using a proportional-integral (P-I) controller.

15. The charging device of claim 9 further comprising a relay in communication with the electronic control device, the electronic control device controlling the relay to effectively couple and decouple the second battery from the converter in response to the state of charge of the second battery.

16. A vehicle, comprising:
primary and secondary batteries;
a converter that converts power from an external source; and
an electronic controller that controls converter output voltage to effectively decouple the secondary battery from the converter while remaining electrically connected thereto while charging the primary battery and powering vehicle comfort devices in response to a state of charge of the secondary battery exceeding a threshold while the vehicle is connected to the external power supply.

17. The vehicle of claim 16, the electronic controller controlling the converter output voltage so that no current flows to and from the secondary battery when the secondary battery state of charge exceeds the threshold.

18. The vehicle of claim 16, the electronic controller increasing the converter output voltage to exceed voltage of the secondary battery and power the vehicle comfort devices and charge the secondary battery when the secondary battery state of charge is below the threshold.

19. The vehicle of claim 16 wherein the primary battery comprises a traction battery and the secondary batter comprises a low-voltage battery.

20. The vehicle of claim 16 further comprising:
a current sensor connected in series with the secondary battery and in communication with the electronic controller, the electronic controller increasing or decreasing the converter output voltage to reduce the current flowing to and from the secondary battery as measured by the current sensor toward zero when the vehicle is connected to the external power supply and the secondary battery state of charge exceeds the threshold.

* * * * *